United States Patent
Wang et al.

(10) Patent No.: US 7,219,842 B2
(45) Date of Patent: May 22, 2007

(54) SCANNING UNIT SUITABLE FOR APPLICATIONS WITH A HIGH-SPEED SCANNING REQUIREMENT

(75) Inventors: Chung-Wei Wang, Taichung (TW); Yuan-Hsu Chou, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 157 days.

(21) Appl. No.: 11/185,278

(22) Filed: Jul. 19, 2005

(65) Prior Publication Data

US 2006/0082840 A1    Apr. 20, 2006

(30) Foreign Application Priority Data

Oct. 20, 2004    (TW) .............................. 93131809 A

(51) Int. Cl.
*G06K 7/10*    (2006.01)
(52) U.S. Cl. .................................. 235/462.32; 235/454
(58) Field of Classification Search ................ 235/454, 235/462.01–462.49, 472.01–472.03; 358/474
See application file for complete search history.

(56) References Cited

U.S. PATENT DOCUMENTS

| | | | | |
|---|---|---|---|---|
| 4,338,018 A | * | 7/1982 | Kuehnle et al. ............ | 399/151 |
| 4,512,626 A | * | 4/1985 | Kamiya et al. ............. | 359/200 |
| 4,703,186 A | * | 10/1987 | Nakayama et al. ......... | 250/566 |
| 5,170,047 A | * | 12/1992 | Beauchamp et al. ........ | 250/202 |
| 5,854,867 A | * | 12/1998 | Lee et al. ...................... | 385/49 |
| 6,268,938 B1 | * | 7/2001 | Lee ............................. | 358/498 |
| 6,563,609 B1 | * | 5/2003 | Hattori ....................... | 358/475 |
| 6,597,428 B1 | * | 7/2003 | Adachi et al. ................ | 355/40 |
| 2003/0075696 A1 | * | 4/2003 | Kiermeier et al. ..... | 250/559.36 |

\* cited by examiner

*Primary Examiner*—Kimberly D. Nguyen
(74) *Attorney, Agent, or Firm*—David N. Lathrop; Gallagher & Lathrop

(57) ABSTRACT

A scanning unit includes a lamp-mounting body having a top surface formed with an elongate opening that is disposed between a pair of parallel first and second grooves. First and second reflective layers are attached respectively over curved groove-defining surfaces of walls defining respectively the first and second grooves. Tubular first and second lamps are mounted respectively in the first and second grooves. An intersecting line of a first plane in which a middle line of the curved groove-defining surface defining the first groove and a first central axis of the first lamp are disposed, and a second plane in which a middle line of the curved groove-defining surface defining the second groove and a second central axis of the second lamp are disposed, is located on a scanning surface, and is disposed directly above the opening.

5 Claims, 4 Drawing Sheets

SCANNING UNIT SUITABLE FOR APPLICATIONS WITH A HIGH-SPEED SCANNING REQUIREMENT

CROSS-REFERENCE TO RELATED APPLICATION

This application claims priority of Taiwanese Application No. 093131809, filed on Oct. 20, 2004.

BACKGROUND OF THE INVENTION

1. Field of the Invention

The invention relates to a scanning unit, more particularly to a scanning unit suitable for applications with a high-speed scanning requirement.

2. Description of the Related Art

FIG. 1 illustrates a conventional scanning unit 1 installed to an optical mechanism 2 of a scanner. The conventional scanning unit 1 includes an L-shaped mounting seat 101 disposed under a scanning surface 3, a reflector 102 mounted on the mounting seat 101, and a tubular lamp 103 mounted at the reflector 102.

Since the amount of light generated by the single lamp 103 is not sufficient for high-speed scanning, the conventional scanning unit 1 is not suitable for applications with a high-speed scanning requirement. Furthermore, although current scanners emphasis high resolution, they are merely suitable for low-speed scanning required for the less amount of incident light. As such, if it is required to increase the scanning speed of the conventional scanning unit 1, the quality of a scanned image is poor. Accordingly, to obtain a scanned image with the same quality at an enhanced scanning speed, it should be solved to improve the amount of incident light. Furthermore, since the reflector 102 is mounted to an L-shaped wall surface 101' of the mounting seat 101, the reflector 102 easily deforms and is hard to mount to the mounting seat 101.

SUMMARY OF THE INVENTION

Therefore, the object of the present invention is to provide a scanning unit that has a sturdy construction, that can provide high-luminance incident light due to excellent light-collecting effect and that is suitable for applications with a high-speed scanning requirement.

According to the present invention, there is provided a scanning unit adapted to be disposed under a scanning surface. The scanning unit comprises:

a lamp-mounting body adapted to be disposed under the scanning surface, and having a top surface adapted to face the scanning surface and formed with a pair of parallel first and second grooves that extend in a longitudinal direction of the lamp-mounting body, the top surface being further formed with an elongate opening disposed between the first and second grooves and extending in the longitudinal direction, each of the first and second grooves being defined by a wall of the lamp-mounting body that has a curved groove-defining surface, each of the curved groove-defining surfaces having a middle line extending in the longitudinal direction, and opposite lateral edges;

first and second reflective layers attached respectively over the curved groove-defining surfaces of the groove-confining walls of the first and second grooves in the lamp-mounting body; and tubular first and second lamps extending in the longitudinal direction and mounted respectively in the first and second grooves in the lamp-mounting body, the first and second lamps having first and second central axes, respectively;

both said middle line of each of said curved groove-defining surfaces and a corresponding one of said first and second axes being disposed in a plane, each said curved groove-defining surface being symmetrical about a corresponding one of said planes, an intersecting line of said planes being adapted to be located on the scanning surface and being disposed directly above said opening in said lamp-mounting body.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
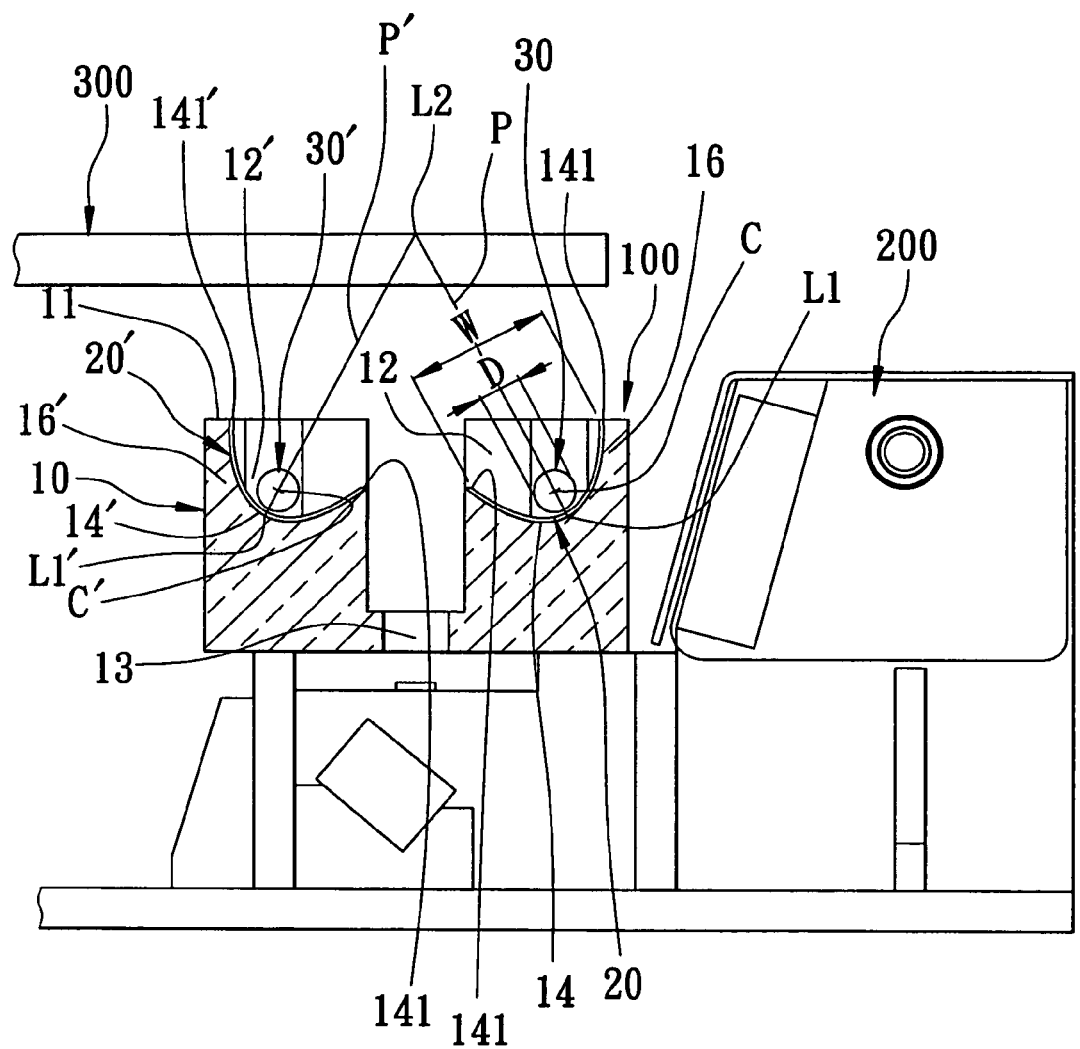
FIG. 2 is a partly sectional schematic view showing the preferred embodiment of a scanning unit.

Referring to FIG. 2, the preferred embodiment of a scanning unit 100 according to the present invention is shown to be adapted for installation to an optical mechanism system 200 of, for example, a scanner or a copy machine. The scanning unit 100 is adapted to be disposed under a scanning surface 300. In this embodiment, the scanning surface 300 can be an upper surface of a transparent panel for placing a document thereon. The scanning unit 100 includes a lamp-mounting body 10, first and second reflective layers 20, 20', and tubular first and second lamps 30, 30'.

Figure 3:
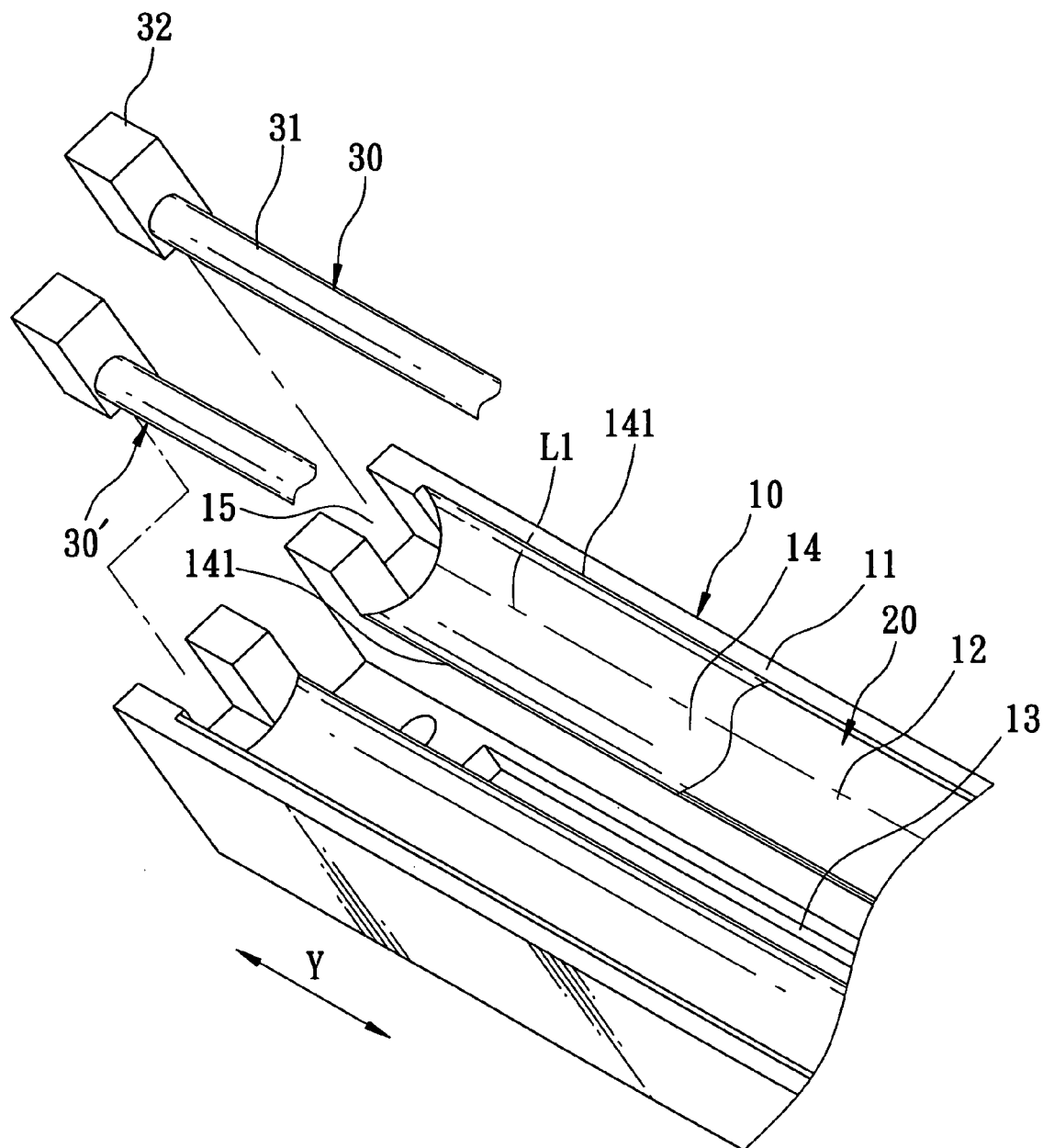
FIG. 3 is a fragmentary exploded perspective view showing the preferred embodiment.

With further reference to FIG. 3, the lamp-mounting body 10 is adapted to be disposed under the scanning surface 300, and has a top surface 11 adapted to face the scanning surface 300 and formed with a pair of parallel first and second grooves 12, 12' that extend in a longitudinal direction (Y) of the lamp-mounting body 10. The top surface 11 is further formed with an elongate opening 13 disposed between the first and second grooves 12, 12' and extending in the longitudinal direction (Y). The first groove 12 is defined by a wall 16 of the lamp-mounting body 10 that has a curved groove-defining surface 14. The curved groove-defining surface 14 has a middle line (L1) extending in the longitudinal direction (Y), and opposite lateral edges 141, as best shown in FIG. 3. Similarly, the second groove 12' is defined by a wall 16' of the lamp-mounting body 10 that has a curved groove-defining surface 14'. The curved groove-defining surface 14' has a middle line (L1') extending in the longitudinal direction (Y), and opposite lateral edges 141', as shown in FIG. 2. In this embodiment, each of the curved groove-defining surfaces 14, 14' is a fit-curved surface.

The first and second reflective layers 20, 20' are attached fixedly and respectively over the curved groove-defining surfaces 14, 14' of the walls 16, 16' of the lamp-mounting body 10, as shown in FIG. 2. In this embodiment, each of the first and second reflective layers 20, 20' can be formed by spray painting, electroplating or a film application process.

The first and second lamps 30, 30' extend in the longitudinal direction (Y), and are mounted respectively in the first and second grooves 12, 12' in the lamp-mounting body 10, as shown in FIG. 2. In this embodiment, each of the first and second lamps 30, 30' has opposite engaging end portions 32 (only one is shown in FIG. 3), each of which is engaged in a respective engaging groove 15 in the top surface 11 of the lamp-mounting body 10, and an intermediate lighting portion 31 interconnecting the engaging end portions 32. Preferably, a ratio of a diameter (D) of the first lamp 30 and a distance (W) between the lateral edges 141 of the curved groove-defining surface 14 of the wall 16 defining the first groove 12 is not greater than 0.3, as shown in FIG. 2. Similarly, a ratio of a diameter of the second lamp 30' and a distance between the lateral edges 141' of the curved groove-defining surface 14' of the wall 16' defining the second groove 12' is not greater than 0.3. Since the first and second lamps 30, 30' shield a smaller part of a region of reflecting light beams, such a structure results in an increased amount of incident light beams on the scanning surface 300 such that the optical mechanism system 200 can obtain better scanned image signals.

The first and second lamps 30, 30' have first and second central axes (C, C'), respectively, as shown in FIG. 2. When the first and second lamps 30, 30' are mounted respectively in the first and second grooves 12, 12', both the middle line (L1) of the curved groove-defining surface 14 of the wall 16 defining the first groove 12 and the first central axis (C) of the first lamp 30 are disposed in a first plane (P), and both the middle line (L1') of the curved groove-defining surface 14' of the wall 16' defining the second groove 12' and the second central axis (C') of the second lamp 30' are disposed in a second plane (P'). Moreover, the curved groove-defining surface 14 of the wall 16 defining the first groove 12 is symmetrical about the first plane (P), and the curved groove-defining surface 14' of the wall 16' defining the second groove 12' is symmetrical about the second plane (P'). An intersecting line (L2) of the first and second planes (P, P') is adapted to be located on the scanning surface 300, and is disposed directly above the opening 13 in the lamp-mounting body 10.

Figure 1:
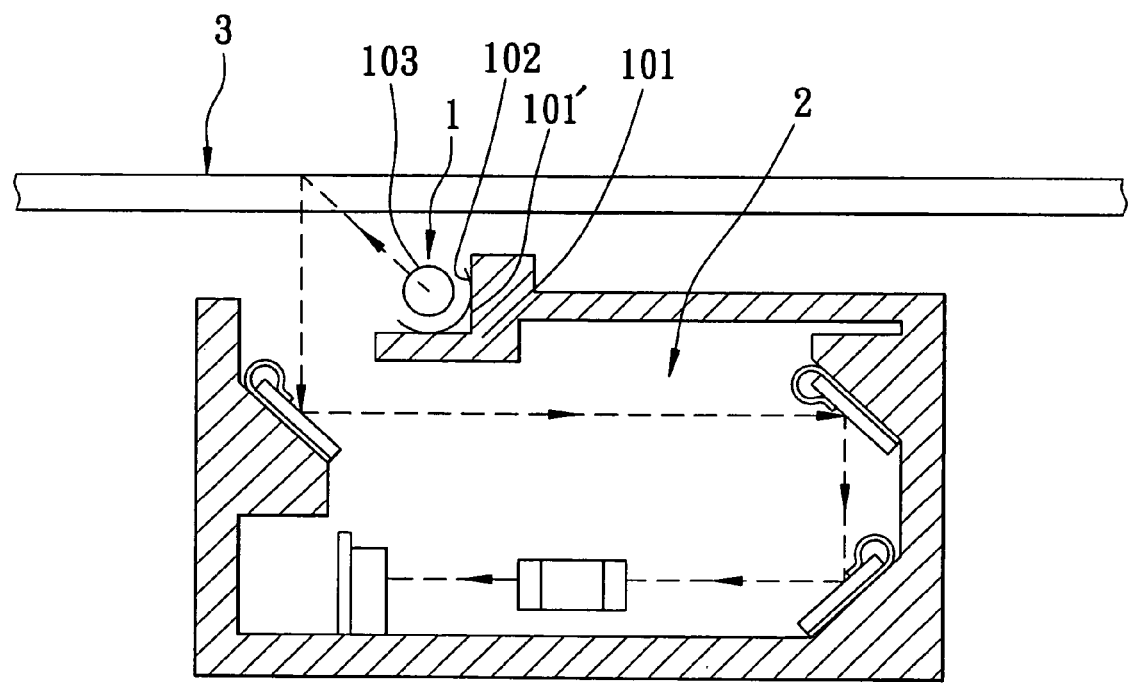
FIG. 1 is a partly sectional schematic view of a conventional scanning unit.
Figure 4:
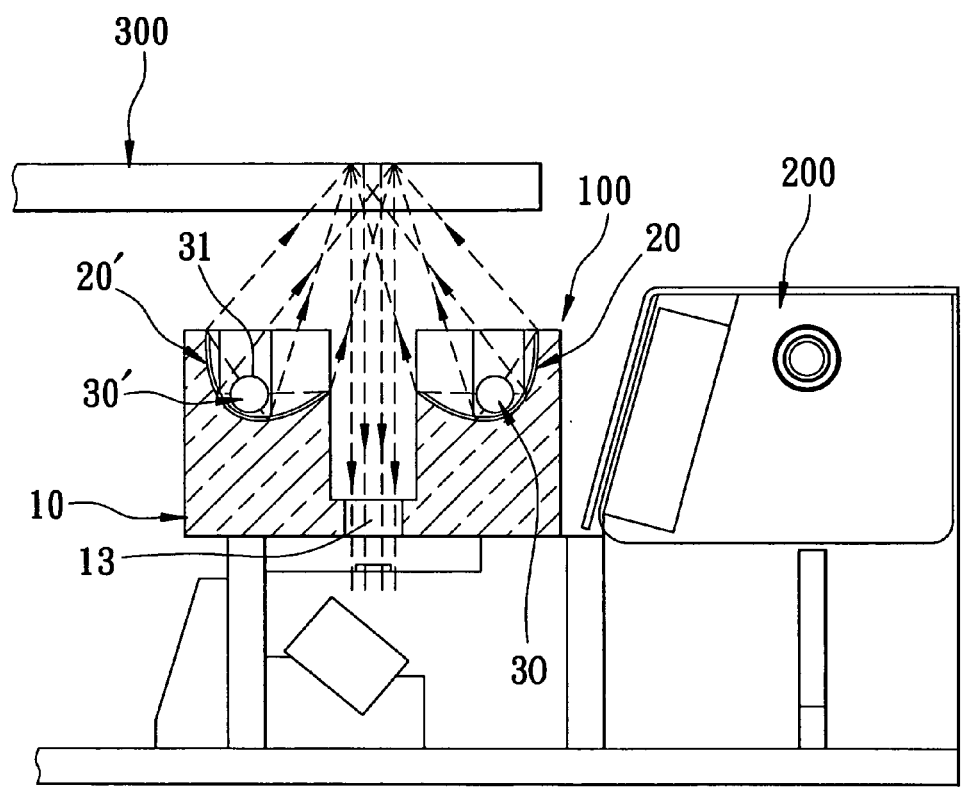
FIG. 4 is a partly sectional schematic view of the preferred embodiment illustrating propagation of light beams generated by first and second lamps.

As shown in FIG. 4, when the scanning unit 100 is activated, light beams generated by the intermediate lighting portions 31 of the first and second lamps 30, 30' and reflected from the first and second reflective layers 20, 20' collect in a predetermined area of the scanning surface 300, and are then reflected into the optical mechanism system 200 via the opening 13. As such, the scanning unit 100 of the present invention can generate light having a higher luminance than in prior art configurations (see FIG. 1), thereby resulting in an enhanced image-scanning quality. As a result, the scanning unit 100 is suitable for applications with a high-speed scanning requirement. Furthermore, since the first and second layers 20, 20' are attached securely and respectively over the curved groove-defining surfaces 14, 14' of the walls 16, 16' defining the first and second grooves 12, 12', deformation of the first and second layers 20, 20' can be avoided.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A scanning unit adapted to be disposed under a scanning surface, comprising:

a lamp-mounting body adapted to be disposed under the scanning surface, and having a top surface adapted to face the scanning surface and formed with a pair of parallel first and second grooves that extend in a longitudinal direction of said lamp-mounting body, said top surface being further formed with an elongate opening disposed between said first and second grooves and extending in the longitudinal direction, each of said first and second grooves being defined by a wall of said lamp-mounting body that has a curved groove-defining surface, each of said curved groove-defining surfaces having a middle line extending in the longitudinal direction, and opposite lateral edges;

first and second reflective layers attached respectively over said curved groove-defining surfaces of said walls of said lamp-mounting body; and tubular first and second lamps extending in the longitudinal direction and mounted respectively in said first and second grooves in said lamp-mounting body, said first and second lamps having first and second central axes, respectively;

both said middle line of each of said curved groove-defining surfaces and a corresponding one of said first and second axes being disposed in a plane, each said curved groove-defining surface being symmetrical about a corresponding one of said planes, an intersecting line of said planes being adapted to be located on the scanning surface and being disposed directly above said opening in said lamp-mounting body.

2. The scanning unit as claimed in claim 1, wherein a ratio of a diameter of each said lamp and a distance between said lateral edges of each said curved groove-defining surface is not greater than 0.3.

3. The scanning unit as claimed in claim 1, wherein each of said first and second reflective layers is formed by spray painting.

4. The scanning unit as claimed in claim 1, wherein each of said first and second reflective layers is formed by electroplating.

5. The scanning unit as claimed in claim 1, wherein each of said first and second reflective layers is formed by a film application process.

* * * * *